(12) United States Patent
Takahashi

(10) Patent No.: US 7,165,858 B2
(45) Date of Patent: Jan. 23, 2007

(54) HEADLAMP APPARATUS FOR VEHICLE

(75) Inventor: Kazuki Takahashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 178 days.

(21) Appl. No.: 10/816,137

(22) Filed: Apr. 1, 2004

(65) Prior Publication Data

US 2004/0246730 A1    Dec. 9, 2004

(30) Foreign Application Priority Data

Apr. 3, 2003   (JP)   ............... P.2003-099827

(51) Int. Cl.
*B60Q 1/00*   (2006.01)
(52) U.S. Cl. ............... 362/37; 362/464; 315/82
(58) Field of Classification Search ............... 362/36, 362/37, 464, 465, 466; 315/81, 82
See application file for complete search history.

(56) References Cited

U.S. PATENT DOCUMENTS 6,626,563 B2 * 9/2003 Nishimura et al. ......... 362/465
6,634,773 B2 * 10/2003 Hayami ..................... 362/464
6,805,472 B2 * 10/2004 Fukawa ..................... 362/466

FOREIGN PATENT DOCUMENTS

JP      6-12488     2/1994
JP      2514834     4/1996

* cited by examiner

*Primary Examiner*—John Anthony Ward
(74) *Attorney, Agent, or Firm*—Fish & Richardson P.C.

(57) ABSTRACT

A headlamp apparatus for a vehicle accurately detects a straight steering position in a steering device of the vehicle, thereby controlling a light distribution characteristic of a headlamp of the vehicle. In a headlamp apparatus for a vehicle including a controller for controlling a light distribution of a headlamp based on a steering angle of a steering device of the vehicle, the controller detects a straight steering position based on an origin position signal obtained when each of wheel speeds SPDL and SPDR of left and right wheels (front wheels 3LF and 3RF) of the vehicle is at least a reference value α and a difference in the speed is equal to or lower than a reference value β on the basis of an origin position signal PZ to be output from the steering device for each rotation of a steering wheel and the difference in the speed.

7 Claims, 8 Drawing Sheets

HEADLAMP APPARATUS FOR VEHICLE

This application claims foreign priority to Japanese Patent application no. JP2003-099827, filed Apr. 3, 2003, the contents of which is incorporated herein by reference.

BACKGROUND OF THE INVENTION

1. Technical Field

The present invention relates to a headlamp apparatus for a vehicle such as a car and more particularly to a detecting device for detecting the straight steering direction of a vehicle in a headlamp apparatus comprising light distribution control means for changing the direction and range of irradiation of a headlamp in the steering direction of the vehicle, for example, an adaptive illuminating system (hereinafter referred to as an AFS (Adaptive Front-lighting System).

2. Background of the Related Art

The related art AFS proposed to enhance the running safety of a car detects information about the running situation of a car CAR by means of a sensor and sends a detection output to an electronic control unit (hereinafter referred to as an ECU (Electronic Control Unit)) 2 as shown in FIG. 1. For the related art sensor, there is used a steering sensor 11 for detecting the steering angle of a steering wheel 12 provided in a steering device 1 of the car CAR, for example. Based on the output of the steering sensor 11, the ECU 2 controls lamps which are provided on the left and right of the front part of the car that can swivel respectively, that is, headlamps 4L and 4R capable of deflecting and controlling an irradiating direction into a transverse direction, thereby changing a light distribution characteristic thereof.

The headlamps 4L and 4R include an actuator to be rotated by means of a driving force source such as a driving motor for a structure in which a reflector and a projector lamp provided in a lamp housing can be rotated in a horizontal direction, for example. According to the related art AFS, when the car travels on a curved road (a curved path), it is possible to illuminate a road to be a source of the curved path corresponding to the running speed of the car, which is effective for enhancing a running stability.

In such a related art AFS, initialization is carried out to turn the swivel lamp in a straight running direction when the steering wheel of the car is steered in the straight running direction. For this reason, it is necessary to detect a steering position (hereinafter referred to as a straight steering position) in the straight running direction of the steering sensor.

In the steering sensor, as shown in FIG. 8(a), a large number of unit slits 113 are formed in a circumferential direction over a rotary disk 11 to be rotated integrally with the steering wheel 12, and furthermore, an origin slit 115 for detecting an origin position is formed at the inside diameter of the unit slit 113. The unit slits 113 and the origin slit 115 are provided with slit detectors DA, DB and DZ such as photo interruptors respectively and are constituted to generate pulse signals PA, PB and PZ corresponding to the slit from the slit detectors DA, DB and DZ with the rotation of the rotary disk 111 as shown in FIG. 8(b).

More specifically, the origin slit 115 outputs the pulse signal PZ to be an origin position signal from the origin slit detector DZ in the straight steering position of the steering wheel 12, the straight steering position of the steering wheel 12 can be detected in response to the origin position signal PZ, and the pulse signals PA and PB sent from the unit slits DA and DB are counted so that the amount of rotation of the steering wheel 12, that is, the steering angle can be detected.

In an ordinary vehicle, however, the steering wheel is constituted to be rotated plural times (generally, three rotations or more). As shown in FIG. 8(b), therefore, the origin position signals PZ (ZR, ZC and ZL) are output for each rotation of the steering wheel, respectively. Thus, it is hard to detect the straight steering position from only the origin position signal PZ. As shown in FIG. 8(a), the origin slit 115 is constituted to output the pulse signal PZ over a predetermined length range in the circumferential direction in consideration of an assembly error in the steering device. For this reason, the origin position signal has a predetermined width in an angular direction (which will be referred to as an origin zone). When the straight steering position is to be determined, the zone width of the origin zone becomes an error. Thus, it is hard to detect the straight steering position with high precision.

In Japanese Patent No. 1884151 (hereafter "JP'151"), there has been proposed a technique for deciding a straight steering position based on an origin position signal to be output when the car has a predetermined vehicle speed. In Japanese Patent No. 2514834 (hereafter "JP '834"), there has been proposed a technique for dividing an origin zone into a plurality of subzones and setting, to be an origin position signal, the signal of the subzone from which the signal is to be output continuously for at least a predetermined time, thereby deciding a straight steering position.

In Journal of Technical Disclosure No. 2002-2053 issued by Japan Institute of Invention and Innovation (hereafter "JIII '053"), there has been disclosed a technique for detecting the speeds of the left, right, front and rear wheels of the car by a speed sensor without using the origin position signal sent from such a steering sensor and recognizing a straight running state when the speeds of both front wheels are equal to each other. In this technique, the steering angle is calculated at a speed ratio of the wheels including the rear wheel when the speeds of both front wheels are different from each other.

However, the foregoing related has various problems and disadvantages. In JP '151, it is hard to carry out detection until the car travels a predetermined distance and at least a predetermined speed has been reached. Therefore, there is a problem in that a significant time is required for detecting a straight steering position. In the case in which a steering angle is exactly coincident with a steering angle at which the origin position signal is to be output when the car travels on a constant curved path, there is a possibility that an angle position for the steering might be erroneously detected as a straight steering position.

In the JP '834, a complicated structure is provided for carrying out processing of dividing the origin zone into a plurality of subzones and selecting the subzone corresponding to a time. In the detection, a predetermined time is required for carrying out the processing, and furthermore, there is a possibility that a steering angle might be erroneously detected as a straight steering position when the car travels on a constant curved path in the same manner as in the case of JP '151.

In JIII '053, the decision is carried out based only on a difference in the speed between both front wheels. Also in the case in which the speeds of both front wheels are slightly different from each other, therefore, it cannot be decided that the straight running is carried out. For this reason, an erroneous detection is caused. In this case, it can be proposed that a margin is provided in a difference in the speed between both front wheels to prevent an error from being detected erroneously. When the car travels at a low speed, the difference in the speed is very small. Therefore, when the difference in the speed enters a margin range, it is hard to detect a straight steering position with high precision.

Moreover, JIII '053 has disclosed that this technique can be used together with a signal obtained from the steering sensor described in the techniques of JP '151 and JP '834. This technique is complementary, that is, the AFS is maintained in response to another signal even if either of them is broken down. When any such signal is utilized, it is hard to eliminate the drawbacks.

SUMMARY OF THE INVENTION

It is an object of the invention to provide a headlamp apparatus for a vehicle, which can accurately detect a straight steering position in a steering device of the vehicle, thereby controlling the light distribution characteristic of a head lamp of the vehicle. However, the present invention need not overcome any of the related art problems, or address any other problems.

The invention provides a headlamp apparatus for a vehicle comprising control means for controlling a light distribution of a headlamp based on a steering angle of a steering device of the vehicle, wherein the control means detects a straight steering position of the steering device from an origin position signal to be output from the steering device for each rotation of a steering wheel and wheel speeds of left and right wheels of the vehicle. More specifically, the control means detects the straight steering position based on the origin position signal when a difference in the wheel speeds of the left and right wheels has a predetermined value or less. Moreover, the control means is constituted to detect the straight steering position when a vehicle speed of the vehicle has a predetermined value or more. Furthermore, it is preferable that the control means should have such a structure to detect the straight steering position and to then correct the straight steering position based on an integrating time in a steering angle position or an integrated running distance.

According to the invention, a decision is made by a logical combination of both the wheel speed of the vehicle and the origin position signal sent from the steering device, thereby detecting the straight steering position. Consequently, it is possible to accurately detect the straight steering position. Also when the running is carried out over a constant curved path, particularly, it is possible to detect the straight steering position accurately with high precision. Consequently, it is possible to suitably control the light distribution characteristic of the headlamp of the vehicle.

BRIEF DESCRIPTION OF THE DRAWINGS

The above and other objects and advantages of the present invention will become more apparent by describing in detail exemplary, non-limiting embodiments thereof with reference to the accompanying drawings, wherein like reference numerals designate like or corresponding parts throughout the several views, and wherein.

DETAILED DESCRIPTION OF THE INVENTION

Figure 1:
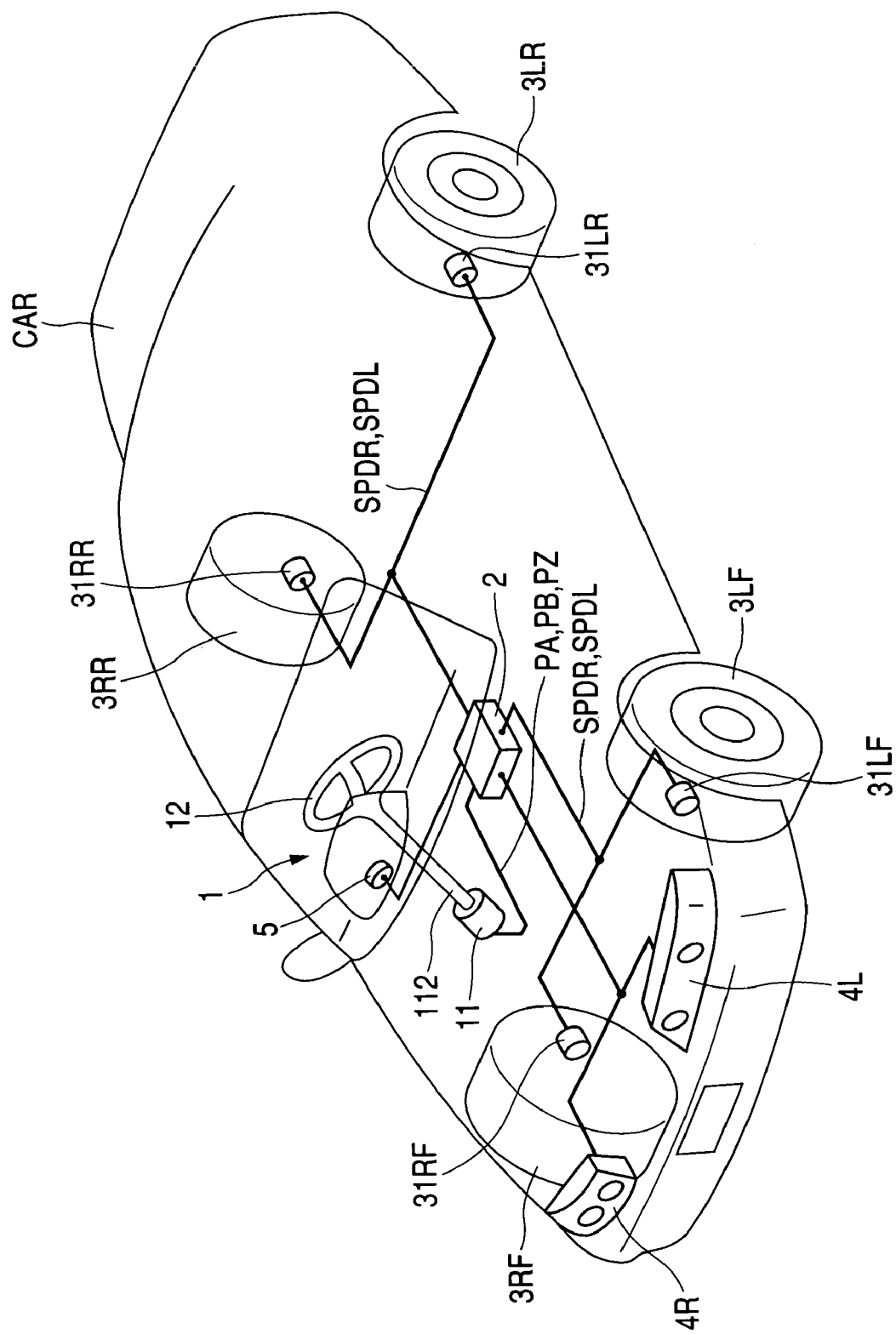
FIG. 1 is a view showing the conceptual structure of an AFS.
Figure 2:
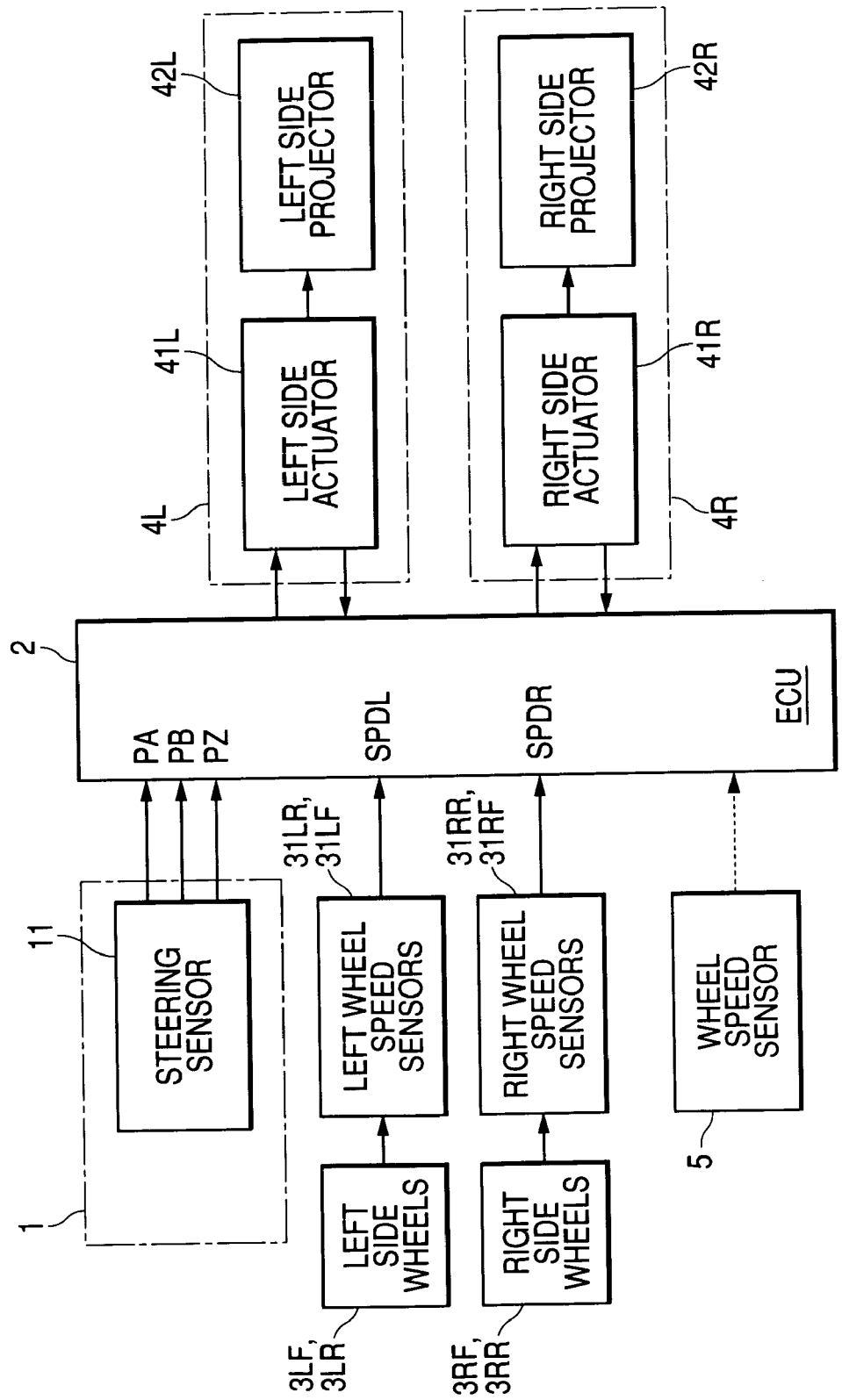
FIG. 2 is a block diagram showing the structure of the main part of a headlamp apparatus according to the invention.

An exemplary, non-limiting embodiment of the present invention will be described with reference to the drawings. FIG. 2 is a block diagram showing a headlamp apparatus according to the invention. With reference to an AFS shown in FIG. 1, a steering sensor 11 is provided in a steering device 1 of a car, and the output of the steering sensor 11 is input to an ECU 2. As a wheel speed sensor for detecting the rotating speeds of four wheels, that is, left, right, front and rear wheels of the car, moreover, left and right front wheels 3LF and 3RF are provided with a wheel speed sensor 31LF of a left front wheel and a wheel speed sensor 31RF of a right front wheel respectively. Similarly, left and right rear wheels 3LR and 3RR are provided with a wheel speed sensor 31LR of a left rear wheel and a wheel speed sensor 31RR of a right rear wheel respectively.

The output of each of the wheel speed sensors 31LF, 31RF, 31LR and 31RR is input to the ECU 2. On the other hand, left and right headlamps 4L and 4R of the car receive a control signal from the ECU 2 so that an optical axis can be rotated in a horizontal direction. Consequently, a light distribution characteristic, that is, an irradiating direction of each of the headlamps 4L and 4R is controlled. Moreover, a vehicle speed sensor 5 is connected to the ECU 2. The vehicle speed sensor will be described below.

Figure 3A:
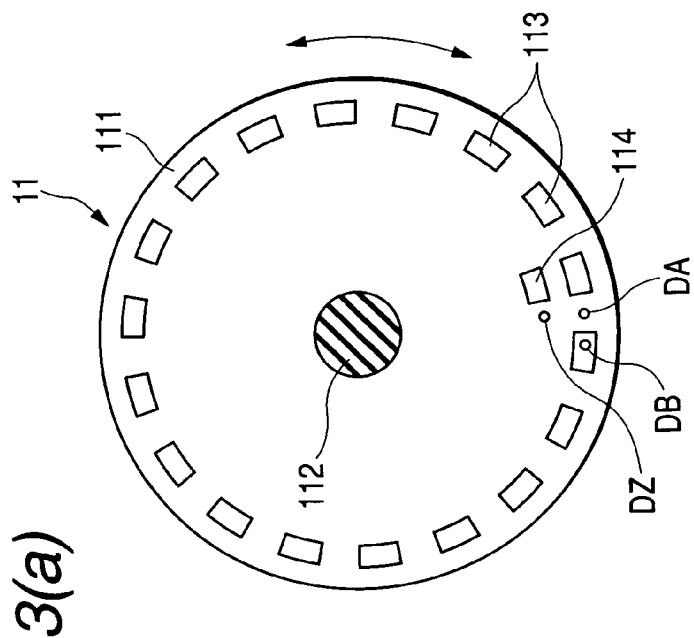
FIG. 3 is a view for explaining a steering sensor and a pulse signal.

As shown in FIG. 3(a), the steering sensor 11 has a rotary disk 111 attached to a part of a steering shaft 112 to be rotated by steering a steering wheel 12 of the steering device 1. The rotary disk 111 has a large number of unit slits 113 opened at a predetermined pitch dimension in a circumferential direction, and furthermore, an origin slit 114 taking the same shape as the shape of the unit slit 113 which is opened in an inside diameter position on a part in the circumferential direction of the unit slit 113. Moreover, an origin slit detector DZ and two unit slit detectors DA and DB constituted by photointerruptors respectively are provided in a position in which the rotary disk 111 is interposed corresponding to the unit slit 113 and the origin slit 114, and the pulse signal of an electric signal is output from each of the slit detectors when the origin slit 114 and the unit slit 113 are set in corresponding positions.

Figure 3B:
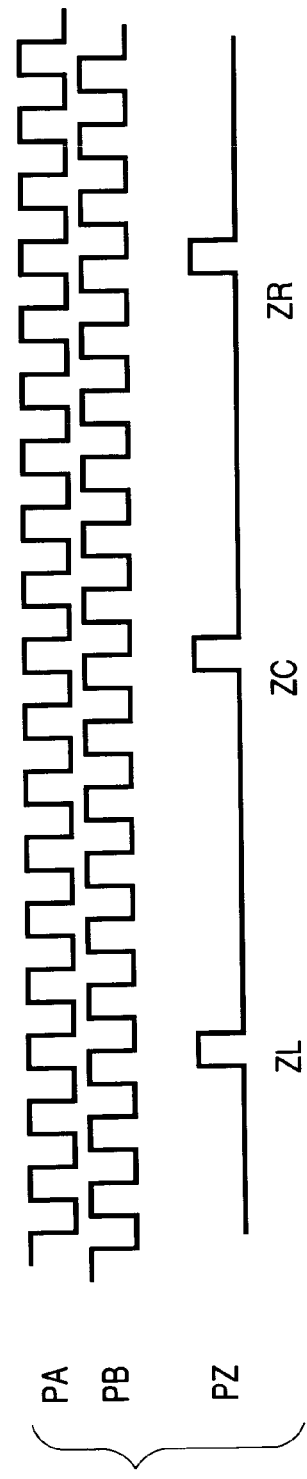

The two unit slit detectors DA and DB are provided apart from each other at a ½ pitch dimension in the circumferential direction, and pulse signals PA and PB having phases shifted from each other by ½ are output from the slit detectors as shown in FIG. 3(b). Moreover, a pulse signal PZ to be an origin position signal is output from the origin slit detector DZ every rotation of the steering wheel 12.

The left and right front and rear wheel speed sensors 31LF, 31RF, 31LR and 31RR are not shown in detail but are provided facing the axles of the wheels 3LF, 3RF, 3LR and 3RR to output the rotating speed of each of the front wheels as a wheel speed. These wheel speed sensors 31LF, 31RF, 31LR and 31RR include a generator utilizing an electric motor, for example, and serve to generate voltages to be changed correlatively to the rotating speed of the axle (the number of rotations per unit time) and to output the generated voltages as AD (analog/digital) converted digital signals to the ECU 2. Alternatively, they are constituted as sensors having such a structure as to use the same rotary disk and photointerruptor as those of the steering sensor and are constituted by encoders for converting an output frequency to be changed following the rotating speed of the axle into a digital value, and for outputting the digital value.

Figure 4:
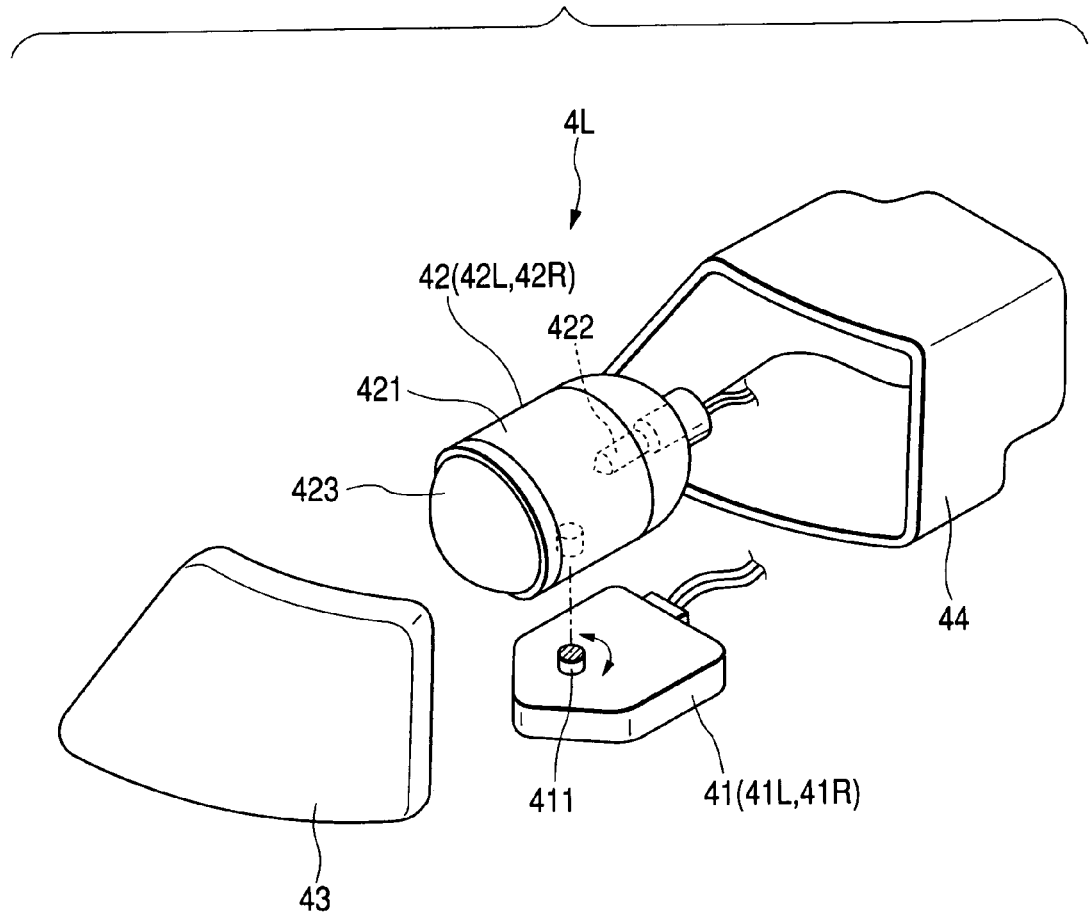
FIG. 4 is a schematic exploded perspective view showing the structure of a headlamp.

The left and right headlamps 4L and 4R are constituted as swivelable lamps. As shown in FIG. 4 illustrating the schematic structure of the left headlamp 4L, a projector lamp 42 (42L) constituted by a lamp body 421, a light source 422 and a lens 423 is rotatably supported in a horizontal direction in a lamp housing 44 having a front cover 43. In addition, the projector lamp 42 is coupled to a rotary output shaft 411 of an actuator 41 (41L) provided on a lower part in the lamp housing 44 over a lower surface and can be rotated in a horizontal direction by the actuator 41.

By the rotation, the direction of the optical axis of the projector lamp 42 can be changed in the horizontal direction. The actuator 41 has a driving motor and a driving gear train provided therein, which are not shown in the drawing. The amount of rotation of the rotary output shaft 411 of the actuator 41 is controlled in response to a control signal output from the ECU 2, and the angle of the optical axis of the projector lamp 42L is changed and controlled by the rotary output shaft 411. Moreover, the actuator 41 includes an angle sensor for detecting the angle of the optical axis of the headlamp and also has such a structure that an optical axis angle signal is output from the angle sensor toward the 2, which is not shown in the drawing. Referring to the right headlamp 4R, similarly, an actuator 41R and a projector lamp 42R are shown in FIG. 2.

In the AFS according to the exemplary, non-limiting embodiment of the present invention, the ECU 2 calculates the rotating angle position of the steering wheel 12, that is, the steering direction of the car based on the pulse signals PA and PB output from the steering sensor 11 and drives the actuator 41 in the steering direction, thereby swiveling the left and right headlamps 4L and 4R to carry out a feedback control for turning the optical axis of each of the headlamps 4L and 4R into the direction of progress of the car. Referring to the pulse signal output from the steering sensor 11, with reference to FIG. 3(b), the pulse signals PA and PB sent from the unit slit detectors DA and DB are repetitive pulse signals shifted by a ½ cycle and the pulse signal PZ sent from the origin slit detector DZ is a pulse signal output for each rotation of the steering wheel 12, that is, an origin position signal. The steering wheel 12 is rotated within an angle range a little more than three rotations in a full steering angle range. For this reason, three origin position signals ZR, ZC and ZL are output within the full steering angle range.

Accordingly, it is possible to count either of the pulse signals PA and PB by means of an up-down counter (not shown), thereby detecting the rotating angle position of the steering wheel from a count value thus obtained, for example. When the car is to run over a curved path, a road to be a curving source can be illuminated corresponding to the running speed of the car, which is effective for enhancing running stability.

In order to properly carry out the swivel control in the ECU 2, it is necessary to detect that the steering wheel 12 is placed in a straight steering position, to set the count value of the up-down counter to be an initial value at that time and to simultaneously set the optical axes of the headlamps 4L and 4R in the straight running direction of the car, that is, to carry out an initialization.

Figure 5:
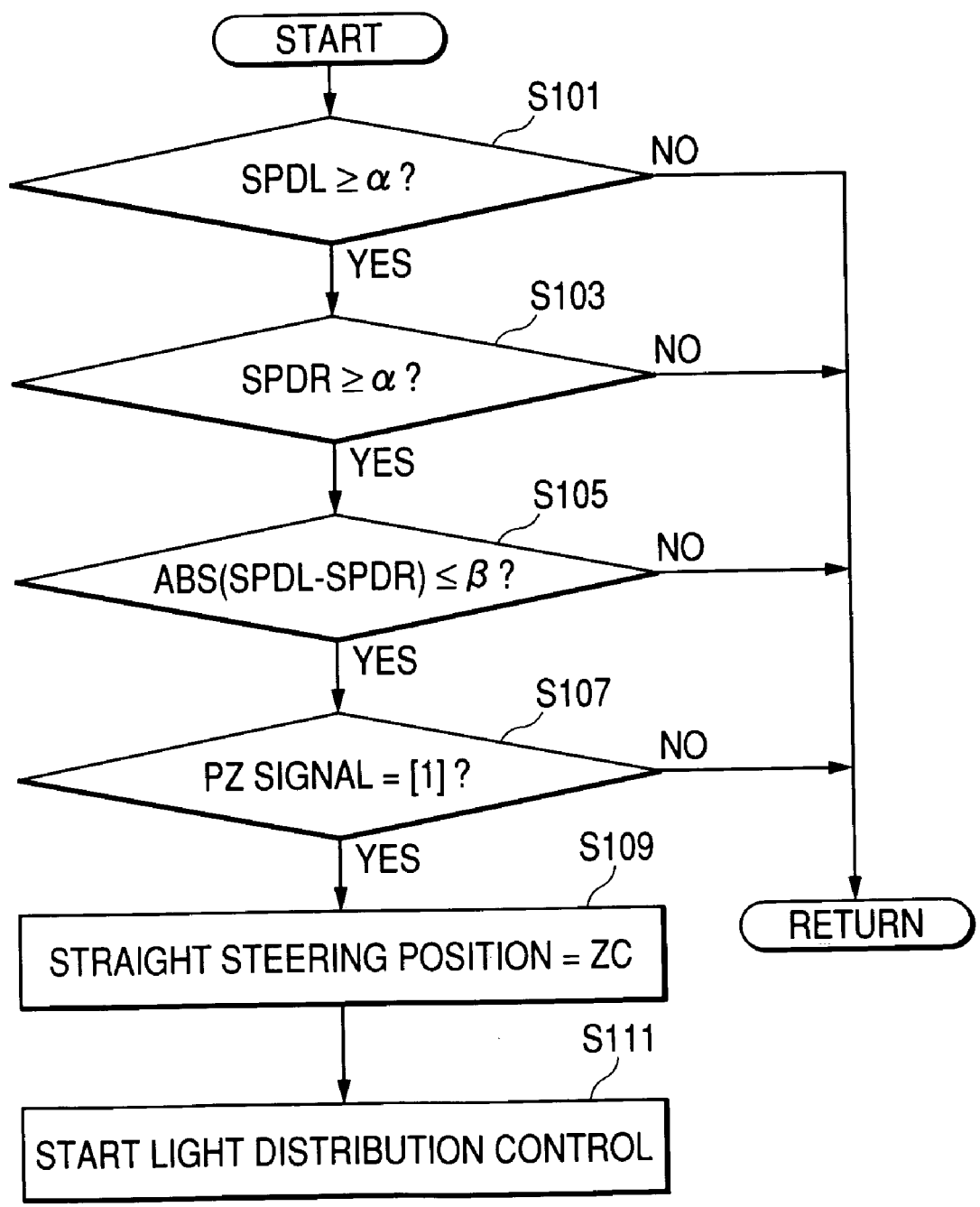
FIG. 5 is a flow chart for explaining an operation for an initialization and a light distribution control.

FIG. 5 is a flow chart showing an operation for carrying out the initialization. In step S101, a wheel speed SPDL sent from the wheel speed sensor 31LF of the left front wheel 3LF is compared with a reference speed a (threshold). When the wheel speed SPDL is lower than the reference speed α, the processing returns and the initialization is not carried out. When the wheel speed SPDL is equal to or higher than the reference speed α, it is assumed that the car is running and the processing proceeds to step S103.

At step S103, a wheel speed SPDR sent from the wheel speed sensor 31RF of the right front wheel 3RF on the opposite side is compared with the reference speed a (threshold). When the wheel speed SPDR is lower than the reference speed α, the processing returns and the initialization is not carried out. When the wheel speed SPDR is equal to or higher than the reference speed α, it is confirmed that the car is running and the processing proceeds to step S105.

At step S105, a difference ABS between the wheel speeds SPDL and SPDR of both front wheels 3LF and 3RF is calculated and the difference ABS is compared with a reference value β (threshold) to be a predetermined wheel speed. When the difference ABS is greater than the reference value β0, both front wheels 3LF and 3RF are rotating at different wheel speeds and it is decided that the car is steered by means of the steering wheel 12 and travels a curved path. For this reason, the initialization is not carried out. When the difference ABS is equal to or smaller than the reference value β, both front wheels 3LF and 3RF are rotated at substantially equal wheel speeds and it is decided that the car is running in a substantially straight running condition. Consequently, the processing proceeds to a step S107 to wait for the origin position signal sent from the steering sensor 11, that is, the pulse signal PZ.

As shown in FIG. 3(b), the rotation is carried out within an angle range, which is a little more than three rotations in the full steering angle range of the steering wheel 12. For this reason, the pulse signal PZ, that is, the origin position signal PZ is output in the three origin positions ZR, ZC and ZL within the full steering angle range. The origin position ZC corresponds to the straight steering position of the steering wheel 12 and the other origin positions ZR and ZL correspond to steering positions in which the steering wheel 12 is rotated once to the right and left, respectively.

In a waiting state at step S107, it is decided whether the car is running in the almost straight running condition as described above. When the origin position signal PZ is input from the steering sensor 11, it is decided that the origin position signal PZ is a signal in the origin position ZC which is output to the straight steering position of the steering wheel 12. For this reason, a steering angle position in which the origin position signal PZ is to be input is set into the straight steering position (S109). At step S111, the initialization process is completed, and light distribution control occurs.

In the exemplary, non-limiting embodiment, a length in the circumferential direction of the origin slit 114 formed on the rotary disk 111 of the steering sensor 11 is short and substantially equivalent to that of the unit slit 113, and the pulse width of the pulse signal PZ output from the origin slit 114 is small. Even if a point where the origin position ZC of the origin position signal PZ is detected is exactly set to be the straight steering position, therefore, an accurate straight steering position can be detected.

After the straight steering position is thus detected, the count value of the up-down counter is reset and is then set to be an initial value. Furthermore, the actuators 41L and 41R of the left and right headlamps 4L and 4R are subject to the feedback control based on the optical axis angle signal output from each of the actuators 41L and 41R, thereby setting the direction of the optical axis of each of the headlamps 4L and 4R to be a straight running direction. Consequently, the initialization process is completed. Then, the steering angle of the steering wheel 12 is detected from the count values obtained by counting, through the up-down counter, the pulse signals PA and PB output from the unit slit detectors DA and DB of the steering sensor 11 as described above. The actuators 41L and 41R are controlled based thereon. Thus, each of the headlamps 4L and 4R can carry out the swiveling operation in the steering direction.

In this exemplary, non-limiting embodiment, thus, when the wheel speeds of both front wheels are equal to or higher than a predetermined speed, a state having a high probability that the car will be set in the straight running state is recognized from a difference between both wheel speeds and the origin position signal input in this state is decided to be a signal in the straight steering position. Consequently, the straight steering position can be detected accurately and immediately when the car travels a substantially small distance. Thus, rapid detection can be carried out.

As shown in a broken line of FIG. 2, the vehicle speed sensor 5 for detecting the vehicle speed may be connected to the ECU 2 interlockingly with the speedometer of the car to input, to the ECU 2, a vehicle speed V detected by the vehicle speed sensor 5.

Figure 6:
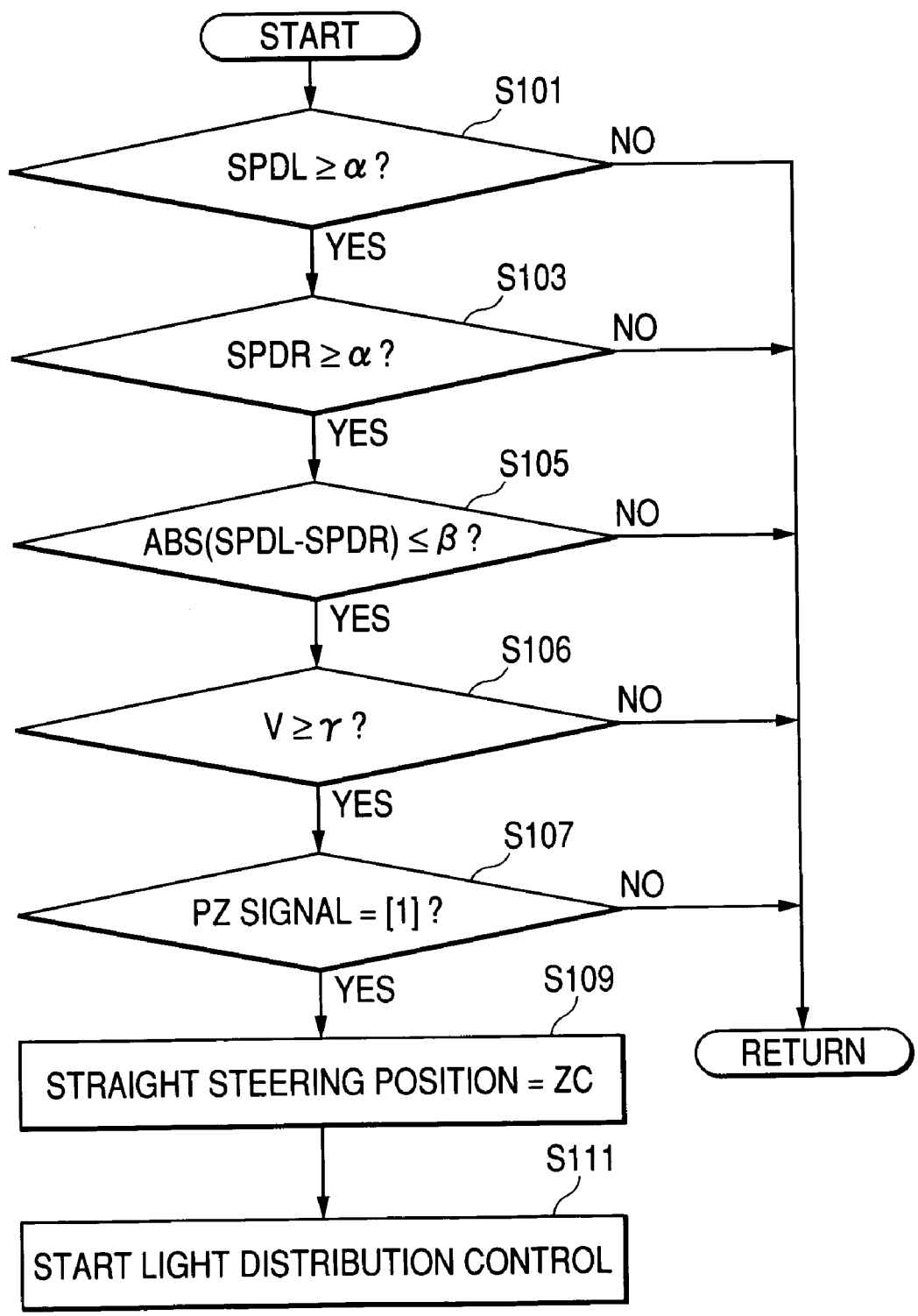
FIG. 6 is a flow chart showing another example of the operation for the initialization and the light distribution control.

As shown in a flow chart of FIG. 6, the wheel speeds SPDL and SPDR of the left and right front wheels are compared with the reference value α, and furthermore, the difference ABS between both wheel speeds is compared with the reference value β at steps S101, S103 and S105 in the same manner as in the embodiment. Further, vehicle speed V obtained from the vehicle speed sensor 5 is then compared with a reference value γ at a step S106. Only when the vehicle speed V is equal to or higher than the reference value γ, that is, a predetermined vehicle speed, the processing proceeds to a step S107. When the car is running in such a state as to satisfy the condition that the wheel speeds SPDL and SPDR of both front wheels are equal to or higher than the reference value α and the difference between both wheel speeds is equal to or smaller than the reference value β, for example, the car is running at a low speed over a curved path having a constant curvature. Thus, the initialization is not carried out. As a result, it is possible to prevent the erroneous detection of the straight steering position.

Figure 8A:
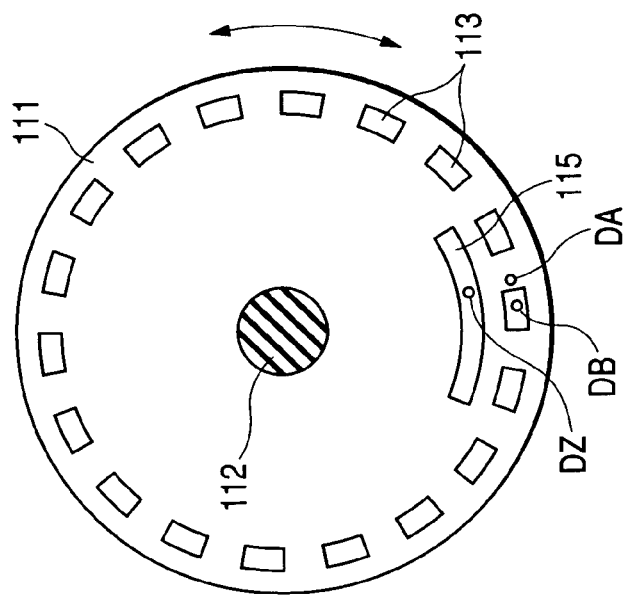
FIGS. 8(a)–(b) illustrate a related art steering sensor and corresponding pulse signals.
Figure 8B:
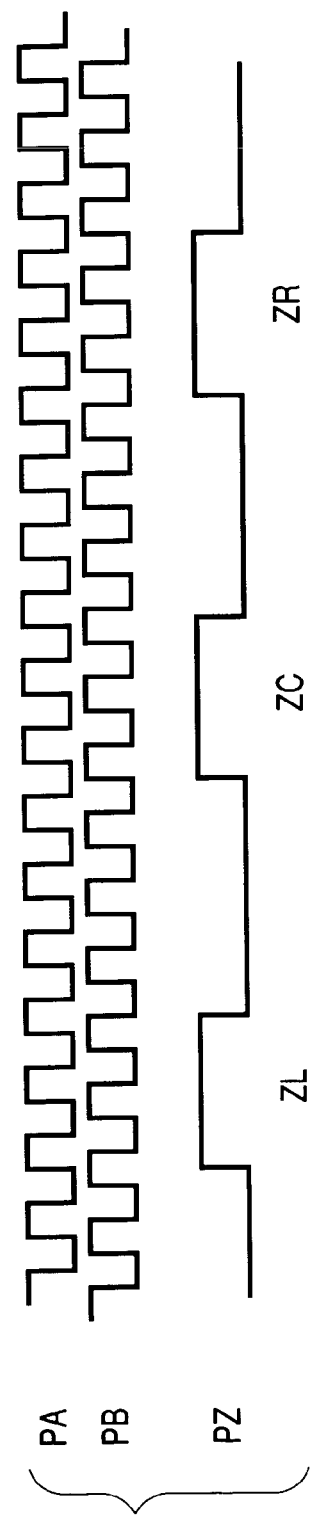

When a length in the circumferential direction of a related art origin slit 115 is set to be greater than that of the unit slit 113 in consideration of various errors in the steering device as in a conventional steering sensor shown in FIGS. 8(a)–(b), the pulse width of the pulse signal PZ to be the origin position signal is also increased. Consequently, there is a possibility that a detection error might be made in the straight steering position by the pulse width. Therefore, it is also possible to carry out a correction for obtaining a central position within the range of the origin position signal PZ with high precision by utilizing the pulse signals PA and PB simultaneously with the detection of the origin position signal PZ.

Figure 7A:
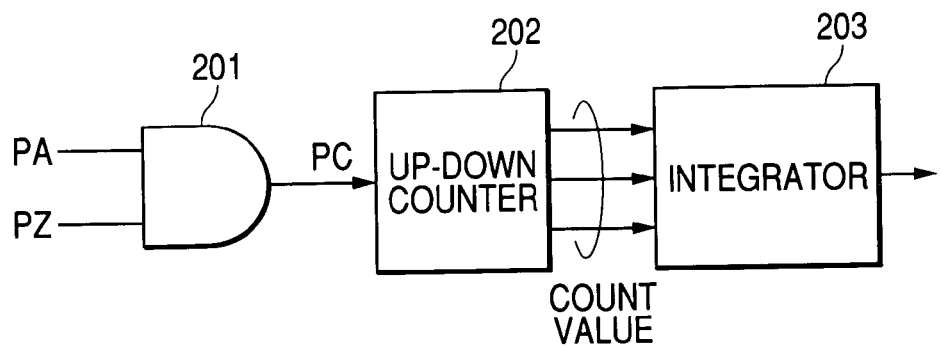
FIG. 7 is a circuit diagram and a waveform diagram in the case in which a straight steering position is obtained with high precision.
Figure 7B:
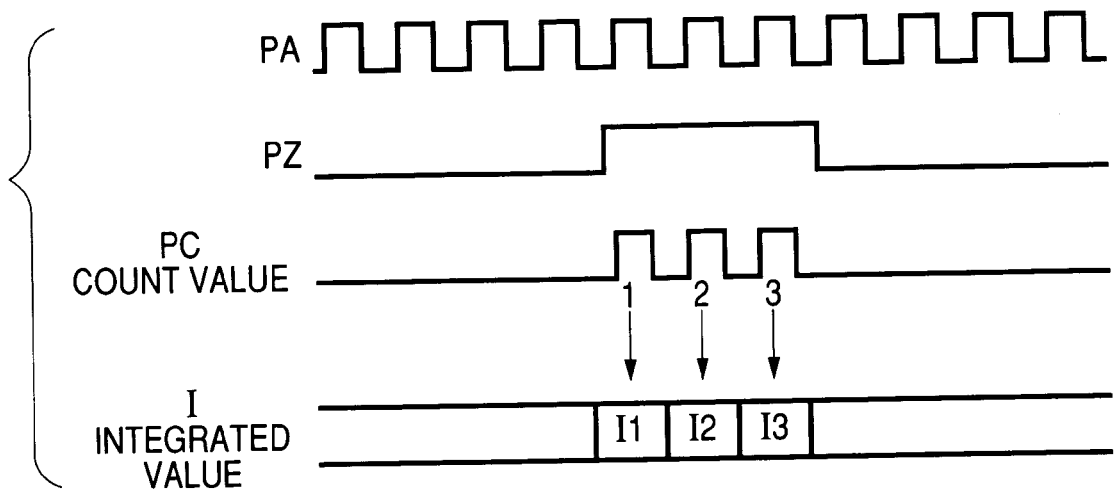

For example, but not by way of limitation, as shown in FIG. 7(a), either of the pulse signals PA and PB, that is, the pulse signal PA and the origin position signal PZ are sent to an AND gate 201 and a pulse signal PC output from the AND gate 201 is counted by an up-down counter 202. A count value is obtained by counting the pulse signal PC from one of rising points of the origin position signal PZ toward the other rising point, and is equivalent to each of pulses P1, P2 and P3 of the pulse signal PA that are arranged with in the range of the origin position signal PZ. The number of the count values obtained by the counting through the up-down counter 202 is integrated by means of an integrator 203 for a predetermined time.

The count values thus obtained by the counting through the up-down counter 202, that is, integrated values (the number of integrations) 11, 12 and 13 of the pulses P1, P2 and P3 are relative compared with each other so that a count value (pulse) having the greatest integrated value is obtained. Consequently, the position of the pulse can be corrected as an accurate central position, that is, a straight steering position. This is based on an empirical rule that the longest time is required for maintaining a running condition in a straight running state during the running of the car, that is, setting the steering wheel into the straight steering position through a rotation. Similarly, the distribution of the integrated distance of the car with each count value is taken from the number of integrations of each count value of the up-down counter 202 and the vehicle speed obtained from the vehicle speed sensor 5.

Consequently, it is possible to obtain an accurate straight steering position corrected from angle positions corresponding to the pulses P1, P2 and P3 which are equivalent to a count value having the longest integrated distance in the manner described above. In any case, a straight steering position can be detected with high precision and an accurate initialization can be carried out when the same steering sensor as that of the conventional art is used. Also when the wheel speeds of the left and right front wheels are changed depending on a variation in the state of the car, for example, a variation in the air pressure of a tire or the conditions of a road such as a change in a road surface, thus, it is possible to detect a precise straight steering position at each time.

While the wheel speeds of the left and right front wheels 3LF and 3RF are utilized to detect the steering direction of the car in the embodiment, the wheel speeds obtained from the wheel speed sensors 31LR and 31RR of the left and right rear wheels 3LR and 3RR may be utilized to detect the steering direction. While there has been described the example in which the projector lamp is used as the headlamp, it is apparent that the invention can be applied to an AFS having such a structure as to rotate a reflector, thereby deflecting the irradiating optical axis of a lamp. Referring to a method for correcting the straight steering position, moreover, it is apparent that methods other than the method described above can be employed.

The present invention has various advantages. For example, but not by way of limitation, as described above, in the invention, a decision is made by a logical combination of both the wheel speed of a vehicle and an origin position signal sent from a steering device, there by detecting a straight steering position. Consequently, the straight steering position can be detected accurately in a short time. In particular, the straight steering position can be detected accurately with high precision also when the vehicle travels a constant curved path. Thus, an erroneous detection can be prevented. According to the invention, consequently, it is possible to implement an AFS capable of suitably controlling the light distribution characteristic of a headlamp of the vehicle.

I claim:

1. A headlamp apparatus for a vehicle comprising:
a steering device coupled to a steering wheel; and
control means for controlling a light distribution of the headlamp based on a steering angle of the steering device, wherein the control means detects a straight steering position of the steering device from an origin position signal output by the steering device for each rotation of the steering wheel and when a difference between a left wheel speed and a right wheel speed is equal to or less than a predetermined value
wherein the steering device comprises
a rotary disk, attached to a steering shaft of the steering wheel, having a plurality of unit slits circumferentially positioned on the rotary disk and an origin slit positioned at an inside diameter of said unit slits;
at least one origin slit detector that generates the origin position signal when the origin slit passes the origin slit detector; and
at least two unit slit detectors separated at a half pitch from each other on the circumferential position of said unit slits, to generate respectively at least two pulse signals, wherein the control means controls the light distribution by adjusting the headlamp based on a degree of rotation of the steering wheel.

2. The headlamp apparatus for a vehicle according to claim 1, wherein the control means detects the straight steering position when a vehicle speed of the vehicle has at least a predetermined value.

3. The headlamp apparatus for a vehicle according to claim 1, wherein the control means detects the straight steering position and corrects the straight steering position based on at least one of an integrating time in a steering angle position and an integrated running distance.

4. A headlamp apparatus for a vehicle, comprising:
a first speed sensor that is coupled to a first wheel and senses a first wheel speed, and a second speed sensor that is coupled to a second wheel and senses a second wheel speed;
a steering sensor that is coupled to a steering shaft of a steering wheel for turning the vehicle and detects a degree of rotation of the steering wheel;
a controller that controls light distribution in a headlamp and initializes a straight position of the headlamp when the first wheel speed and the second wheel speed exceed or equal a first threshold, and when a difference between the first wheel speed and the second wheel speed is equal to or less than a second threshold; and
a vehicle velocity sensor that senses a vehicle velocity, wherein the controller initializes the straight position when the vehicle velocity exceeds or equals a third threshold.

5. The apparatus of claim 4, further comprising at least one actuator for adjusting a position of the headlamp in response to an output from the controller.

6. A headlamp apparatus for a vehicle, comprising:
a first speed sensor that is coupled to a first wheel and senses a first wheel speed, and a second speed sensor that is coupled to a second wheel and senses a second wheel speed;
a steering sensor that is coupled to a steering shaft of a steering wheel for turning the vehicle and detects a degree of rotation of the steering wheel;
a controller that controls light distribution in a headlamp and initializes a straight position of the headlamp when the first wheel speed and the second wheel speed exceed or equal a first threshold, and when a difference between the first wheel speed and the second wheel speed is equal to or less than a second threshold;
a rotary disk attached to the steering shaft and having a plurality of unit slits circumferentially positioned on the rotary disk, and an origin slit positioned at an inside diameter of the unit slits;
at least one origin slit detector that generates an origin position signal when the origin slit passes the origin slit detector; and
at least two unit slit detectors separated at a half pitch from each other on the circumferential position of the unit slits, to generate respectively at least two pulse signals, wherein the controller controls the light distribution by adjusting the headlamp based on the degree of rotation.

7. The apparatus of claim 6, further comprising at least one actuator for adjusting a position of the headlamp in response to an output from the controller.

* * * * *